(12) United States Patent  
Komaki et al.

(10) Patent No.: US 7,890,232 B2  
(45) Date of Patent: Feb. 15, 2011

(54) AIRBAG SYSTEM

(75) Inventors: Hiroyuki Komaki, Hyogo (JP); Yasushi Tani, Hyogo (JP); Kazuaki Matsuda, Aichi (JP)

(73) Assignee: Fujitsu Ten Limited, Kobe-Shi (JP)

( * ) Notice: Subject to any disclaimer, the term of this patent is extended or adjusted under 35 U.S.C. 154(b) by 1093 days.

(21) Appl. No.: 11/502,396

(22) Filed: Aug. 11, 2006

(65) Prior Publication Data

US 2007/0046004 A1   Mar. 1, 2007

(30) Foreign Application Priority Data

Aug. 23, 2005   (JP) .............................. 2005-241161

(51) Int. Cl.
  *B60R 22/00*  (2006.01)
  *E05F 15/00*  (2006.01)
  *G05D 3/00*  (2006.01)

(52) U.S. Cl. .......................... 701/45; 701/33; 307/10.1; 280/728.1; 280/729; 280/730.1; 280/734; 280/735; 361/88

(58) Field of Classification Search .................... 701/33, 701/45; 307/9.1, 10.1; 280/728.1, 729, 730.1, 280/734, 735; 340/635, 657; 361/88
See application file for complete search history.

(56) References Cited

U.S. PATENT DOCUMENTS

| 4,278,971 A | * | 7/1981 | Yasui et al. ................. 340/635 |
| 4,504,082 A | * | 3/1985 | Brown et al. ................ 280/735 |
| 4,950,914 A | * | 8/1990 | Kurihara et al. ............ 307/10.1 |
| 5,085,464 A | * | 2/1992 | Behr et al. .................. 280/735 |
| 5,406,127 A | * | 4/1995 | Furui et al. ................ 307/10.1 |
| 5,648,759 A | * | 7/1997 | Miller et al. ................ 340/660 |

(Continued)

FOREIGN PATENT DOCUMENTS

JP      A 8-85417      4/1996

(Continued)

OTHER PUBLICATIONS

Jun. 9, 2010 Japanese Office Action issued in Japanese Patent Application No. 2006-218686 with English Translation.

*Primary Examiner*—Khoi Tran  
*Assistant Examiner*—Jaime Figueroa  
(74) *Attorney, Agent, or Firm*—Oliff & Berridge, PLC (57) ABSTRACT

A first processing circuit determines a collision of a vehicle based on an output from a sensor for detecting a collision of the vehicle. A second processing circuit outputs a signal to deploy an airbag based on an output from the first processing circuit. A communication unit controls information communication between the first processing circuit and an electronic control unit outside the airbag system. A first power supply unit generates a first driving voltage for driving the first and second processing circuits based on a voltage of an outside power supply. The first power supply unit includes backup power supply unit that supplies a backup voltage when the voltage of the outside power supply falls. A second power supply unit supplies a second driving voltage to the communication unit based on an output of the first power supply unit. A power supply control unit stops the supply of the second driving voltage from the second power supply unit to the communication unit on detection of a fall in the voltage of the outside power supply.

15 Claims, 5 Drawing Sheets

U.S. PATENT DOCUMENTS

| | | | |
|---|---|---|---|
| 5,974,557 A * | 10/1999 | Thomas et al. | 713/322 |
| 5,995,891 A * | 11/1999 | Mayumi et al. | 701/45 |
| 6,438,462 B1 * | 8/2002 | Hanf et al. | 700/297 |
| 6,865,063 B2 * | 3/2005 | Ball | 361/93.9 |
| 7,154,733 B2 * | 12/2006 | Sibrai | 361/248 |
| 7,224,263 B2 | 5/2007 | Maehara | |
| 7,380,631 B2 * | 6/2008 | Midorikawa | 180/268 |
| 7,409,277 B2 * | 8/2008 | Ito | 701/45 |
| 2003/0107406 A1 * | 6/2003 | Li et al. | 326/83 |
| 2003/0155754 A1 * | 8/2003 | Komaki et al. | 280/735 |
| 2004/0183515 A1 * | 9/2004 | Ota et al. | 323/315 |
| 2004/0204800 A1 * | 10/2004 | Honda | 701/1 |
| 2005/0264268 A1 * | 12/2005 | Ueno | 323/211 |
| 2006/0217863 A1 * | 9/2006 | Ito | 701/45 |

FOREIGN PATENT DOCUMENTS

| | | |
|---|---|---|
| JP | A 10-105309 | 4/1998 |
| JP | A-2001-191892 | 7/2001 |
| JP | A-2003-002156 | 1/2003 |
| JP | A-2004-262376 | 9/2004 |
| JP | A-2004-276811 | 10/2004 |
| JP | A-2004-284382 | 10/2004 |
| JP | A 2004-286029 | 10/2004 |

* cited by examiner

FIG. 1

FIG. 2
AIRBAG ECU ACCORDING TO EMBODIMENT OF THE INVENTION

FIG. 3

OUTPUT CIRCUIT AND AIRBAG

FIG. 4
CONSTRUCTION OF ASIC

FIG. 5
DETAILED CONSTRUCTION OF ASIC

AIRBAG SYSTEM

BACKGROUND OF THE INVENTION

The present invention relates to an airbag system for securing the safety of an occupant of a vehicle by deploying an airbag when the vehicle is involved in a collision or the like, and more particularly to an airbag system which includes a communication unit which makes up a network together with other electronic control units within the vehicle.

A controller area network (hereinafter, referred to as CAN) is a seal bus system which is standardized for vehicles for interchanging information and data between a plurality of electronic control units (hereinafter, referred to as ECU). A CAN driver which controls a CAN communication is normally provided as an independent IC, which is incorporated in an ECU for airbags or the like as an independent part for use. However, CAN driver IC's themselves are expensive and therefore constitute one of main causes for an increase in the ECU cost. Due to this, it has been desired that a CAN driver is incorporated in a single integrated circuit together with other electronic units in the ECU so as to make up an ASIC, whereby the necessity of an independent CAN driver IC is obviated to realize a reduction in the ECU cost.

A CAN driver IC is disclosed in, for example, Japanese Patent Publication No. P10-105309, and the incorporation of a CAN driver in an ASIC is disclosed in, for example, Japanese Patent Publication No. P2004-286029.

Figure 1:
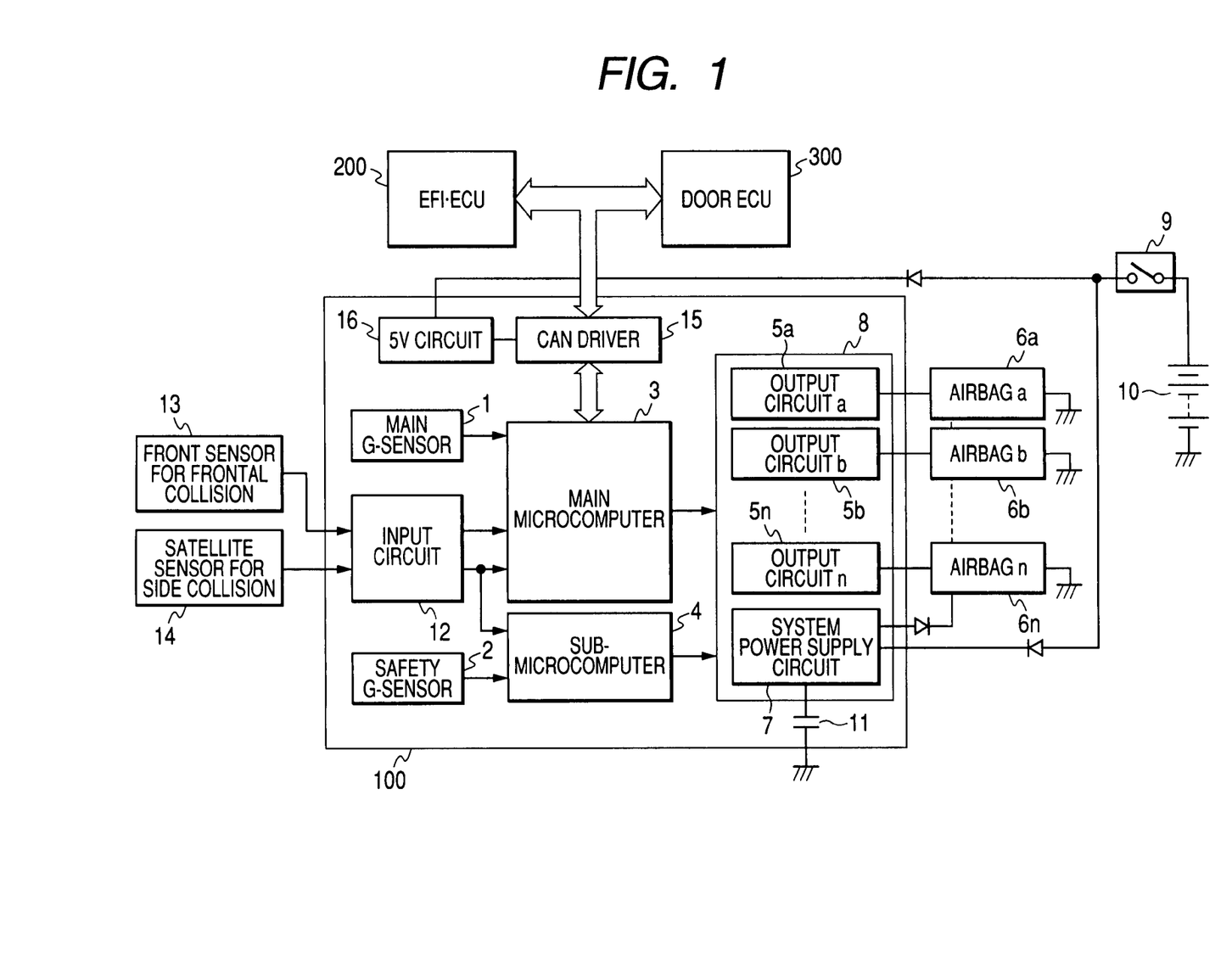
FIG. 1 is a block diagram showing the configuration of a related-art airbag ECU.

FIG. 1 shows the configuration of a related-art airbag ECU in which a CAN driver is incorporated. An airbag ECU 100 includes a main G-sensor (an acceleration sensor) 1 for detecting a collision of a vehicle, a safety G-sensor 2, a microcomputer (hereinafter, referred to as a main microcomputer) 3 for determining on a colliding state in software based on an output of the main G-sensor, a microcomputer (hereinafter, referred to as a sub-microcomputer) 4 for performing a safety collision determination in software based on an output of the safety G sensor 2 and output circuits 5 (5a, 5b, ..., 5n) for outputting airbag ignition signals based on a collision determination signal from the main microcomputer 3 and a safety determination signal from the sub-microcomputer 4. The output circuits 5 outputs a driving signal to airbags 6 (6a, 6b, ..., 6n) which is mounted on the vehicle. Each of the airbags 6 includes a squib (not shown) for exploding by being electrically connected so that the airbag is deployed, and a switching transistor (not shown) for controlling supply of power to the squib. A system power supply circuit 7 supplies power to the squib. The output circuits 5 are connected to a base of the switching transistor. In a case where the output circuits 5 outputs the airbag ignition signals, the switching transistor is turned on and power is supplied to the squib.

Normally, the output circuits 5 are incorporated in a single IC as an ASIC 8 together with a power supply circuit (hereinafter, referred to as a system power supply circuit) 7 which forms a voltage needed to drive individual parts within the airbag ECU from an outside power supply.

The system power supply circuit 7 receives the supply of power by being connected to an onboard batter 10 via an ignition switch and forms a voltage which is necessary to drive the output circuits, the main microcomputer, the sub-microcomputer and the like. Furthermore, the system power supply circuit 7 is connected to a capacitor 11 which functions as a backup power supply and charges the capacitor 11 while power is being supplied thereto from the onboard battery 10, so that when the ignition switch 9 is turned off to thereby stop the supply of power from the onboard battery 10 to the system power supply circuit 7, the capacitor 11 supplies power to the system power supply circuit 7.

The airbag ECU 100 needs to operate properly to deploy the airbags, for example, even when the ignition switch 9 becomes off due to the vehicle being involved in a collision, whereby no power is supplied to the system power supply system 7 from the onboard battery. The backup power supply is such as to be provided to supply power that is necessary for the whole system in such a case.

The airbag ECU 100 includes further an input circuit 12 and inputs outputs from other acceleration sensors 13, 14 which are provided outside the ECU 100 into the main microcomputer 3 and the sub-microcomputer 4 via the input circuit 12. The acceleration sensors 13 are, for example, front sensors for frontal collision which are provided at the front of a vehicle body to detect a frontal collision, and the acceleration sensors 14 are satellite sensors for side collision which are provided on sides of the vehicle body to detect a side collision.

The airbag ECU 100 includes further a CAN driver 15 for performing a CAN communication between the main microcomputer 3 and other outside ECU's such as an electronic fuel injection (hereinafter, referred to as EFI) ECU 200 and a door ECU 300. The CAN driver 15 is provided as an single independent IC. As is described above, since the airbag ECU 100 needs to operate properly even when the outside power supply is cut off, the airbag ECU 100 has the backup power supply, but the CAN driver 15 does not have to continue to operate any longer when the outside power supply is cut off. Due to this, in the event that the system power supply is also used as a power supply for the CAN driver 15, it results that the CAN driver 15 continues to consume current from the backup power supply when the outside power supply is cut off. When the backup power supply is consumed by the CAN driver 15, the backup power supply needs to be configured by a capacitor having a large capacity, and this not only affects badly the miniaturization of the airbag ECU 100 but also constitutes one of main causes of an increase in costs.

Consequently, a power supply for the CAN driver 15 is provided as a separate line in the airbag ECU 100 so that the supply of power to the CAN driver 15 is stopped in the event that the ignition switch 9 becomes off. Reference numeral 16 denotes a power supply circuit for supplying a drive power to the CAN driver 15 (a CAN driver power supply circuit), and a commercially available power supply IC is used for this.

As described above, in the related-art airbag system, in order to secure the necessary backup power supply, the power supply for the communication unit such as the CAN driver needed to be provided as the separate line from the power supply for the airbag system. Due to this, in order to incorporate the communication unit in the processing circuit which outputs an airbag deployment signal, a separate power supply circuit which is connected to the outside power supply by way of a separate line from the power supply circuit for the airbag system, and this complicates the construction of the whole power supply circuit, and in order to realize such a power supply circuit, an IC chip having a large area is necessary. As a result, even in the event that the communication unit, which is configured by the independent IC is incorporated in the processing circuit to omit the communication IC, there still remains a problem that an extensive cost reduction cannot be expected as the whole airbag system.

SUMMARY OF THE INVENTION

It is therefore an object of the invention to provide an airbag system which can realize an extensive cost reduction by incorporating an communication IC within a processing circuit for outputting an airbag deployment signal in an efficient manner.

In order to achieve the above object, according to the invention, there is provided an airbag system comprising a first processing circuit for determining on a collision of a vehicle based on an output from a sensor for detecting a collision of the vehicle and a second processing circuit for outputting a signal to deploy an airbag based on an output from the first processing circuit, wherein the second processing circuit further comprises:

a communication unit that controls information communication between the first processing circuit and an electronic control unit outside the airbag system;

a first power supply unit that generates a first driving voltage for driving the first and second processing circuits based on a voltage of an outside power supply, the first power supply unit that includes backup power supply unit that supplies a backup voltage when the voltage of the outside power supply falls;

a second power supply unit that supplies a second driving voltage to the communication unit based on an output of the first power supply unit; and a power supply control unit that stops the supply of the second driving voltage from the second power supply unit to the communication unit on detection of a fall in the voltage of the outside power supply.

With this configuration, in the second processing circuit, when the power supply control unit detects a fall in the outside power supply voltage, the supply of second drive voltage from the second power supply unit to the communication unit is stopped. Due to this, even when the backup power supply unit is activated due to a fall in the voltage of the outside power supply to supply power to the secondary processing circuit, the supply of power to the communication unit is cut off, so that the backup power is not consumed by the communication unit. Consequently, the second drive voltage for the communication unit can be formed by the second power supply unit based on an output of the first power supply unit, and the circuit configuration of the second power supply unit can be simplified by such an extent that the second drive voltage for the communication unit can be formed by the second power supply unit, whereby the communication unit can be incorporated within the second processing circuit only with a small chip area. As a result, it becomes possible to provide an airbag system at low production costs.

The outside power supply may be an onboard battery which is connected to the airbag system via an ignition switch. The second processing circuit may be made of one ASIC. The communication unit in the second processing circuit may be a CAN driver for controlling a controller area network. The first processing circuit may be made of a microcomputer.

The first power supply unit of the second processing circuit may further comprise a voltage monitoring unit that monitors an input voltage from the outside power supply. The power supply control unit may deactivate the second power supply unit in case where the monitored input voltage in the voltage monitoring unit reaches no more than a predetermined value. With this configuration, even in the event that the backup power supply is started up due to the fall in the voltage of the outside power supply, the second power supply unit is not activated, and consequently, the consumption of the backup power by the communication unit is prevented.

The first power supply unit in the second processing circuit may include a voltage fall detection unit for outputting a reset signal to the power supply control unit when the output of the first power supply unit reaches no more than a predetermined value, that is, when the output of the first power supply unit reaches no more than the first drive voltage of the first and/or second processing circuit, whereby the power supply control unit deactivates the second power supply unit when the reset signal is inputted thereinto. With this configuration, when the output of the first power supply unit lowers below the output level necessary to drive the first and/or second processing circuit, the communication unit is activated, so as to prevent the transmission of erroneous information to the outside electronic control units due to a malfunction of the first processing unit.

In a case where the first processing circuit is made up of a microcomputer, the second processing circuit may further include an overdrive detection circuit for detecting an overdrive of the microcomputer, whereby the power supply control unit may deactivate the second power supply unit when receiving an output of the overdrive detection circuit. With this configuration, in the event that there occurs an overdrive of the microcomputer, the communication unit is stopped so as to secure the reliability in communication.

The second processing circuit may further include a thermal shut-down circuit for stopping the drive of the communication unit on detection of an abnormal heat release from the communication unit. The power supply control unit switches off the second power supply circuit when receiving a detection signal which signals the abnormality of the thermal shut-down circuit. Furthermore, the second power supply unit of the second processing circuit includes a voltage fall detection circuit, whereby the second power supply unit switches off the communication unit based on an output of the voltage fall detection circuit. With this configuration, the reliability in communication by the communication unit is secured. In addition, information on thermal shut-down is transmitted to the microcomputer via the power supply control unit, whereby the microcomputer comes to know that the communication unit stops to be driven due to a thermal shut-down.

The first power supply unit in the second processing circuit may include a voltage increasing circuit for increasing an input voltage from the outside power supply, whereby the backup power supply unit generates a backup voltage based on an output of the voltage increasing circuit. In addition, the second processing circuit may comprise a voltage decreasing circuit in a rear stage of the voltage increasing circuit in the first power supply means, whereby the second power supply unit generates a voltage for the communication unit based on an output of the voltage decreasing circuit. With this configuration, since the second power supply unit can be made up of a low voltage circuit, the circuit configuration is simplified, and the chip area for realizing the whole power supply circuit is reduced.

In the airbag system of the invention, by the configuration that has been described heretofore, since the power supply for the communication unit can be made up of the same line as the power supply for the airbag system, the configuration of the power supply unit for the communication unit can be simplified. Due to this, even in the event that the communication unit is incorporated in the second processing circuit, there occurs no case where the processing circuit thereof becomes so complex as to increase the chip area. Consequently, it is possible to the airbag system which has high reliability at low costs.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 2:
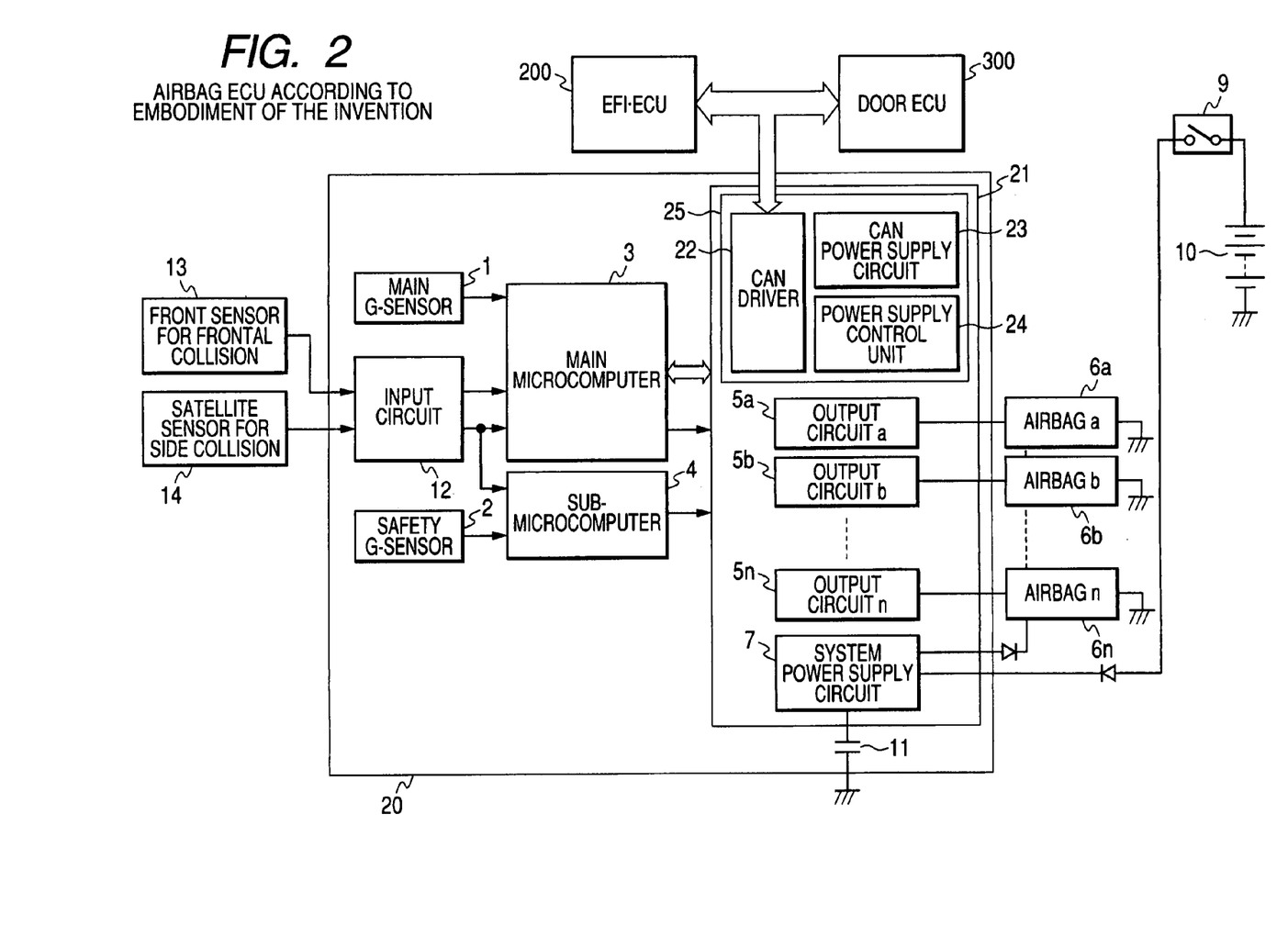
FIG. 2 is a block diagram showing the configuration of an airbag ECU according an embodiment of the invention.

FIG. 2 is a block diagram showing the configuration of an airbag ECU 20 according to an embodiment of the invention. Note that in the figures referred to below, like reference numerals to those shown in FIG. 1 are such as to denote the same or similar constituent members to those shown in FIG. 1.

As shown in FIG. 2, an airbag ECU 20 of this embodiment incorporates a CAN system circuit 25 within an ASIC 21. The CAN system circuit 25 includes a CAN driver 22 as a communication unit, a CAN power supply circuit 23 and a power supply control unit 24. The related-art CAN driver, which is made up of an independent IC, has a thermal shut-down circuit, and therefore, the CAN system circuit 25 similarly has a thermal shut-down circuit 26, which will be described later on by reference to FIG. 4.

Figure 3:
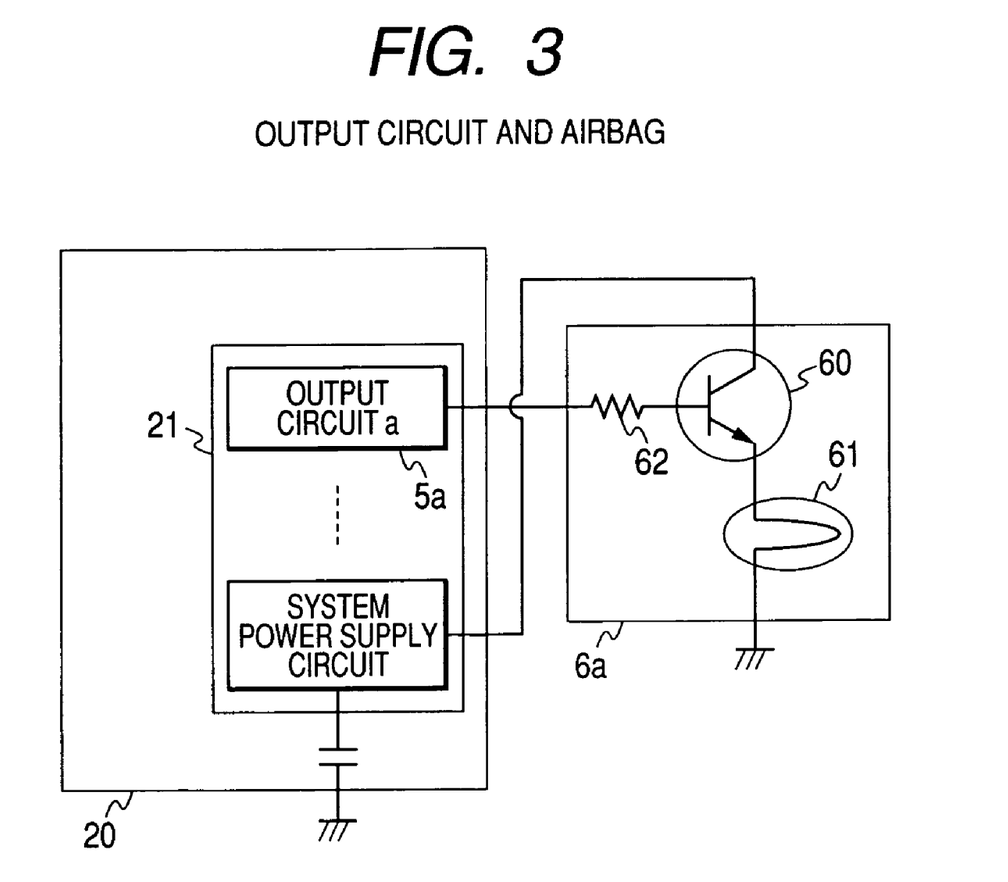
FIG. 3 is a view showing a relation between the output circuit and the airbag which are shown in FIG. 2.

As with the ASIC 8 in FIG. 1, the ASIC 21 has further output circuits 5 (5a, 5b, . . . , 5n) for airbag ignition and a system power supply circuit 7. FIG. 3 is a view showing a relation between the output circuit 5 and the airbag 6. In particular, FIG. 3 representatively shows the output circuit 5a and the airbag 6a. The other output circuits and the airbags have similar configuration. The airbag 6a has a switching transistor 60 connected in series between power B (an in-vehicle battery 10) and grand, and a squib 61. The airbag is configured such that an output of the output circuit 6a is inputted to a base of the switching transistor 60 through resistance 62. Therefore, in case where the output circuit 5a outputs an airbag ignition signal, the switching transistor 60 is turned on and current flows to the squib 61. The squib 61 is heated and exploded by the current, thereby deploying the airbag 6a.

In FIG. 2, The CAN drive circuit 23 incorporates therein a 5V circuit to generate a voltage of 5V for driving the CAN driver 22 based on an intermediate output of the system power supply circuit 7. The power supply control unit 24 has a function to perform an ON/OFF control of the CAN power supply circuit 23 depending on the state of an outside power supply. Consequently, in the event that an onboard battery comes off a vehicle body due to, for example, the vehicle being involved in a collision, whereby no power is supplied to the airbag ECU 20 via an ignition switch 9, the power supply control unit 24 detects this fact and switches off the CAN power supply circuit 23 to thereby prevent the consumption of backup power at the CAN driver 22. The CAN driver 22 is originally such as to inform other ECU's that the vehicle has been involved in a collision. Since a collision signal is transmitted to the airbag microcomputer by way of a different line from this communication line at the time of an actual collision, even in case the power supply for the CAN driver is cut off, the communication of the collision signal is cut off in no case.

Figure 4:
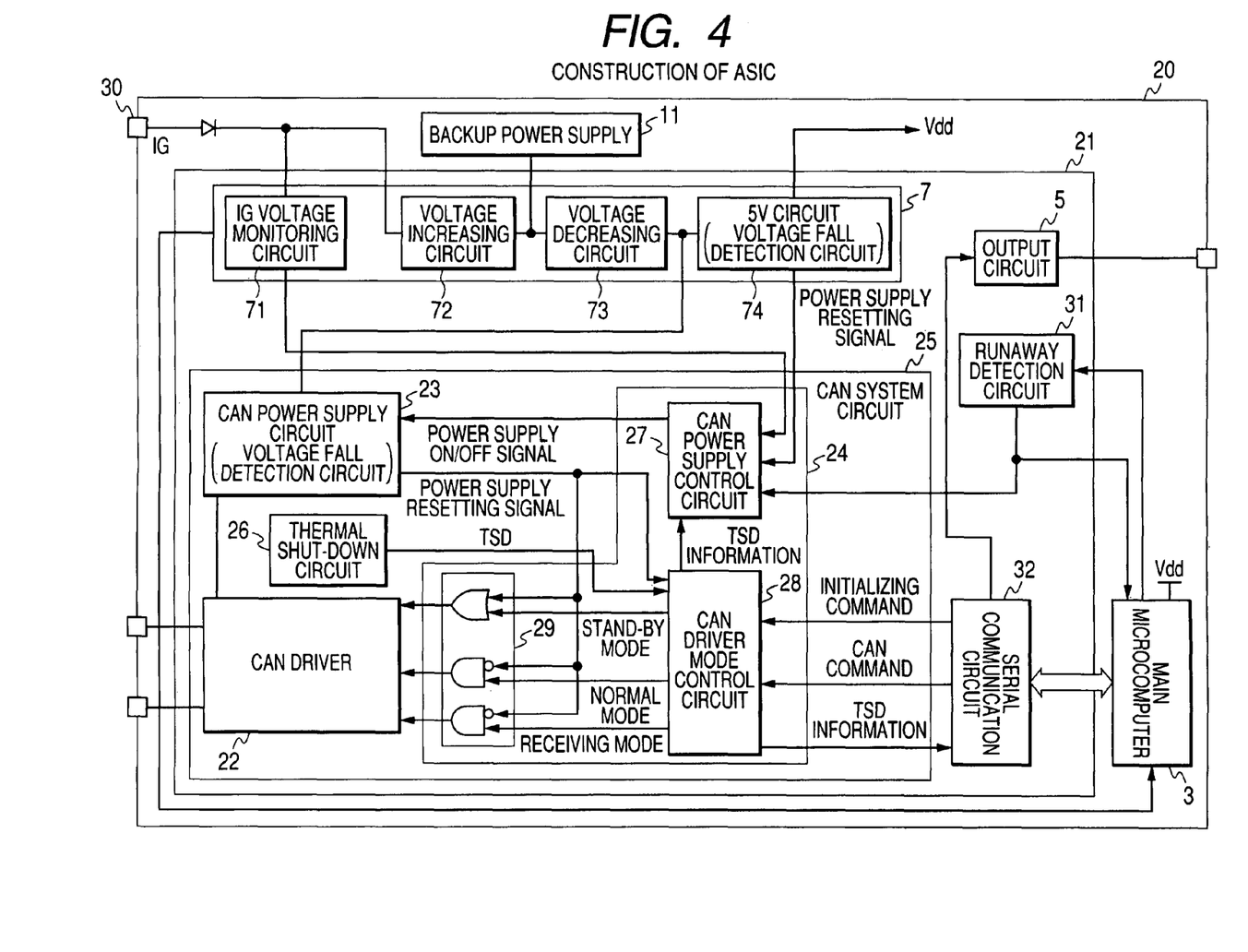
FIG. 4 is a block diagram showing the construction of an ASIC shown in FIG. 2.

FIG. 4 is a diagram showing in detail the ASIC 21 in the airbag ECU 20 shown in FIG. 2 and shows detailed constructions of, in particular, the CAN system circuit 25 and the system power supply circuit 7. As shown in the figure, the system power supply circuit 7 includes an ignition voltage (hereinafter, referred to as an IG voltage) monitoring circuit 71, a voltage increasing circuit 72, a voltage decreasing circuit 73 and the 5V circuit 74. The IG voltage monitoring circuit 71 is connected to an IG input terminal 30 of the airbag ECU 20, and the IG input terminal 30 is connected, in turn, to the onboard battery 10 via the ignition switch 9. An input end of the voltage increasing circuit 72 is connected to the IG input terminal 30. A backup power supply 11 is connected between the voltage increasing circuit 72 and the voltage decreasing circuit 73.

An IG voltage of, for example, 12V which is inputted into the airbag ECU 20 via the IG input terminal 30 is increased to 23V by the voltage increasing circuit 72 in order to change the backup power supply 11 in an efficient fashion. Thereafter, the IG voltage is decreased to, for example, 7V by the voltage decreasing circuit 73, so as to be supplied to the 5V circuit 74. The 5V circuit 74 is such as to generate a system voltage for driving the microcomputer 3 and the like and includes a voltage fall detection circuit so as to output a reset signal to prevent a malfunction of the microcomputer 3 in case a voltage fall occurs.

The ASIC 21 also includes output circuits 5 for igniting airbags, an overdrive detection circuit 31 for detecting an overdrive of the main microcomputer 3 and a serial communication circuit 32 for controlling a communication between the main microcomputer 3 and the ASIC 21. Note that in the output circuits 5, current that is supplied to squibs (not shown) for deploying the airbags 6 is supplied by way of a different line from the line for the system power supply circuit 7.

In FIG. 4, only the ASIC 21, the CAN system circuit 25, the backup power supply 11 and the main microcomputer 3 are shown within the airbag ECU 20, and the other circuits shown in FIG. 1 such as a sub-microcomputer 4, G-sensors 1, 2 and an input circuit 12 are omitted therein.

The CAN system circuit 25 includes a thermal shut-down circuit 26 in addition to the CAN driver 22, the CAN power supply circuit 23 and the power supply control unit 24 made up of a digital circuit, which have been described above. The power control unit 24 includes a CAN power supply control circuit 27, a CAN driver mode control circuit 28 and an input logic circuit 29. An output indicating a monitored result (a voltage fall detection signal) of the IG voltage monitoring circuit 71, a reset signal from the voltage fall detection circuit contained in the 5V circuit 74 and a reset signal from the overdrive detection circuit 31 are inputted into the CAN power supply control circuit 27, and the CAN power supply control circuit 27 outputs a signal signaling to switch off the CAN power supply circuit 23 based on any of the signals so inputted thereinto.

The CAN power supply circuit 23 prepares a drive voltage for the CAN driver 22 based on an output of the voltage decreasing circuit 73 in the system power supply unit 7. The CAN power supply circuit 23 includes the same 5V circuit as the 5V circuit 74 contained in the system power supply circuit 7. A reset signal outputted from this voltage fall detection circuit is inputted into the CAN driver 22 via the CAN driver mode control circuit 28 and the input logic circuit 29.

As described above, the CAN power supply circuit 23 generates the drive voltage of 7V for the CAN driver 22 based on the output of the voltage decreasing circuit 73 in the system power supply unit 7. This depends on the following reason. For example, in a case where the CAN power supply circuit 23 is connected between the voltage increasing circuit 72 and the voltage decreasing circuit 73, and generates the drive voltage of 5V for the CAN driver 22 based on the output of 23V of the voltage increasing circuit 72, a voltage of 18V which is a difference between 23V and 5V is supplied to the CAN power supply circuit 23, thereby causing significant power loss. As a result, the CAN power supply circuit can not be incorporated in the ASIC 21. In a case where the CAN power supply circuit is connected to an input side (16V) of the voltage increasing circuit 72, a voltage of 11V which is a difference between 16V and 5V is supplied to the CAN power supply circuit 23, thereby causing significant power loss. Therefore, it is preferable to connect the CAN power supply circuit to an output side of the voltage decreasing circuit 73.

The CAN driver mode control circuit 28 transmits a stand-by mode setting signal, a normal mode setting signal and a receiving mode setting signal to the CAN driver 22 in response to various commands inputted from the microcomputer 3 by the serial communication circuit 32. When a stand-by setting signal is outputted from the CAN driver mode control circuit 28 or a power supply resetting signal is outputted from the CAN power supply circuit 23, the input logic circuit 29 outputs a stand-by setting signal to the CAN driver 22. Furthermore, when a normal mode setting signal is outputted from the CAN driver mode control circuit 28 and a power supply resetting signal is not outputted from the CAN driver power supply unit 23, the input logic circuit 29 outputs a normal mode setting signal to the CAN driver 22. Furthermore, when a receiving mode setting is outputted from the CAN driver control unit 28 and a power supply resetting signal is not outputted from the CAN power supply circuit 23, the input logic circuit 29 outputs a receiving mode setting signal to the CAN driver 22.

When a release of abnormal heat from the CAN driver 22 occurs, the thermal shut-down circuit 26 detects this fact and outputs a thermal shut-down (TSD) signal to the CAN driver mode control circuit 28. The CAN driver mode control circuit 28 transmits TSD information to the main microcomputer 3 via the CAN power supply control circuit 27 and the serial communication circuit 32. When receiving the TDS information, the CAN power supply control circuit 27 outputs a power supply off signal to the CAN power supply circuit 23, so as to switch off the CAN power supply circuit 23. By receiving the TSD information, the microcomputer 3 comes to know that the CAN driver 22 is in a thermal shut-down state and can make use of the information for control within the airbag ECU 20 or communication control.

Functions of the ASIC 21 to control the CAN power supply will be summarized below.

(1) The voltage fall in the outside input power supply is monitored by the IG voltage monitoring circuit 71, and when the input voltage reaches or lowers below a predetermined value, the CAN power supply circuit 23 is switched off by the CAN power supply control circuit 27, so as to stop the driving of the CAN driver 22.

(2) When a voltage fall is detected in the 5V circuit 74 in the system power supply circuit 7, a power supply resetting signal is outputted to the CAN power supply circuit 27 so as to switch off the CAN power supply circuit 23, so that the supply of power to the CAN driver 22 is stopped.

(3) Since the microcomputer 3 is reset when the overdrive detection circuit 31 for detecting an overdrive of the microcomputer detects an overdrive of the microcomputer, an overdrive detection signal is outputted to the CAN power supply control circuit 27 so as to switch off the CAN power supply circuit 23, so that the supply of power to the CAN driver 22 is stopped.

(4) When a voltage generated in the CAN power supply circuit 23 reaches or lowers below a predetermined value, the CAN power supply circuit 23 outputs a power supply resetting signal and sets the CAN driver 22 to a stand-by mode via the input logic circuit 29. This is done to prevent the loss of a communication guarantee provided by the CAN driver 22 which would otherwise be the case due to the voltage fall of the CAN power supply.

(5) The main microcomputer 3 monitors the output of the IG voltage monitoring circuit 71, and when the main microcomputer 3 determines as a result of the monitoring so carried out that the CAN driver 22 in the ASIC 21 is in an activated state, a CAN command is transmitted from the main microcomputer 3 to the CAN driver mode control circuit 28, so as to set the CAN driver 22 to a normal mode.

(6) When the main microcomputer 3 sets the ASIC 21 to an initializing mode, an initializing command is outputted to the CAN driver mode control circuit 28, so as to set the CAN driver to the stand-by mode.

(7) The thermal shut-down circuit 26 transmits information on the thermal shut-down of the CAN driver 22 to the main microcomputer 3 via the CAN driver mode control circuit 28 and the serial communication circuit 32. The main microcomputer 3 makes use of the information for controlling the other electronic equipment within the airbag ECU 20 and communication control.

Figure 5:
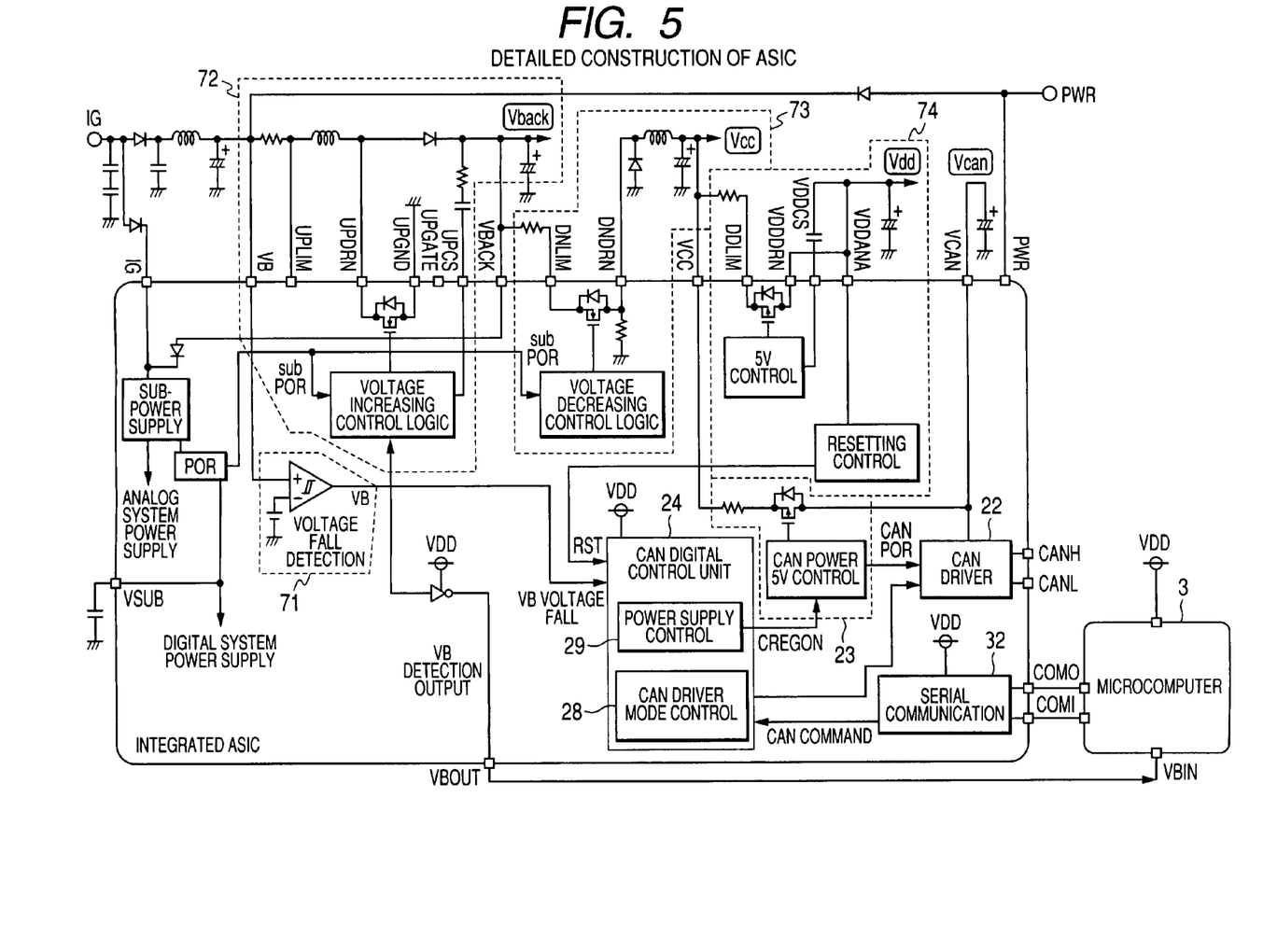
FIG. 5 is a block diagram showing a detailed construction of the ASIC shown in FIG. 4.

FIG. 5 is a diagram showing an example of a detailed construction of the ASIC 21 shown in FIG. 4. A corresponding relation between individual parts shown in FIG. 5 and the constituent members shown in FIG. 4 is indicated by areas indicated by broken lines and reference numerals imparted to the areas. In addition, although the backup capacitor is connected to a leading end of Vback, which is an output of the voltage increasing circuit 72, in reality, the backup capacitor is omitted in this diagram. The CAN power supply circuit 23 generates a voltage for driving the CAN driver 22 based on an output voltage Voo which is set lower than the IG voltage by the voltage decreasing circuit 73. Due to this, an input to the CAN power supply circuit is lowered in voltage, and when being attempted to be incorporated in the ASIC 21, the CAN power supply circuit 23 can be realized by a small chip area. Since the related-art CAN driver is made up of the independent IC, in the event that the CAN driver is designed to share the power supply with the airbag ASIC or to use the power of the airbag ASIC, when the IG becomes off, the CAN driver continues to consume current from the backup power supply for the airbag system. Due to this, power continues to be consumed wastefully even when the IG is off, however, according to the embodiment, since the CAN power supply can be switched off when the IG is off, the wasteful consumption of power can be suppressed.

What is claimed is:

1. An airbag system comprising a first processing circuit for determining on a collision of a vehicle based on an output from a sensor for detecting a collision of the vehicle and a second processing circuit for outputting a signal to deploy an airbag based on an output from the first processing circuit, wherein the second processing circuit is made of one Application Specific Integrated Circuit, the second processing circuit comprising:
a communication unit that controls information communication between the first processing circuit and an electronic control unit outside the airbag system;
a first power supply unit that generates a first driving voltage for driving the first and second processing circuits based on a voltage of an outside power supply, the first power supply unit that includes backup power supply unit that supplies a backup voltage when the voltage of the outside power supply falls;

a second power supply unit that supplies a second driving voltage to the communication unit based on an output of the first power supply unit; and a power supply control unit that stops the supply of the second driving voltage from the second power supply unit to the communication unit on detection of a fall in the voltage of the outside power supply.

2. The airbag system as set forth in claim 1, wherein the outside power supply is an onboard battery which is connected to the airbag system via an ignition switch.

3. The airbag system as set forth in claim 1, wherein:

the first power supply unit of the second processing circuit further comprises a voltage monitoring unit that monitors an input voltage from the outside power supply; and the power supply control unit deactivates the second power supply unit in case where the monitored input voltage in the voltage monitoring unit reaches no more than a predetermined value.

4. The airbag system as set forth in claim 1, further comprising a third processing circuit for processing an output from a second sensor for detecting a collision of the vehicle which is different from the collision detected by the sensor and transmitting a processing result to the second processing circuit.

5. The airbag system as set forth in claim 1, wherein:

the first power supply unit in the second processing circuit comprises voltage fall detection unit that outputs a reset signal to the power supply control unit in case where the output of the first power supply unit reaches no more than a predetermined value; and the power supply control unit deactivates the second power supply unit in case where the reset signal is inputted to the power supply control unit.

6. The airbag system as set forth in claim 1, wherein the first processing circuit is made of a microcomputer.

7. The airbag system as set forth in claim 6, wherein:

the second processing circuit further comprises an overdrive detection circuit for detecting an overdrive of the microcomputer, the power supply control unit deactivates the second power supply unit in case where the power supply control unit receives an output of the overdrive detection circuit.

8. The airbag system as set forth in claim 6, wherein the second processing circuit further comprises a thermal shut-down circuit that deactivates the communication unit on detection of an abnormal heat release from the communication unit.

9. The airbag system as set forth in claim 8, wherein the power supply control unit in the second processing circuit deactivates the second power supply circuit in case where the power supply control unit receives a abnormality detection signal of the thermal shut-down circuit.

10. The airbag system as set forth in claim 8, wherein:

the second processing circuit further comprises a serial communication circuit that communicates with the microcomputer; and an output of the thermal shut-down circuit is transmitted to the microcomputer via the serial communication circuit.

11. The airbag system as set forth in claim 10, wherein:

the microcomputer is operable to monitor an output of the voltage monitoring unit in the first power supply unit of the second processing circuit; and in case where the microcomputer determines through monitoring the voltage monitoring unit that the communication unit is in a communication available state, the microcomputer transmits an activation command to activate the communication unit to the serial communication circuit.

12. The airbag system as set forth in claim 1, wherein:

the second power supply unit of the second processing circuit includes a voltage fall detection circuit; and the second power supply unit deactivates the communication unit based on an output of the voltage fall detection circuit.

13. The airbag system as set forth in claims 1, wherein:

the first power supply unit in the second processing circuit comprises a voltage increasing circuit for increasing an input voltage from the outside power supply; and the backup power supply unit generates a backup voltage based on an output of the voltage increasing circuit.

14. The airbag system as set forth in claim 13, wherein:

the second processing circuit comprises a voltage decreasing circuit in a rear stage of the voltage increasing circuit in the first power supply unit; and the second power supply unit generates a voltage for the communication unit based on an output of the voltage decreasing circuit.

15. The airbag system as set forth in claim 1, wherein the communication unit in the second processing circuit is a CAN driver for controlling a controller area network.

\* \* \* \* \*